(No Model.)
D. J. MURRAY.
SAW GUIDE.
No. 355,707. Patented Jan. 11, 1887.
2 Sheets—Sheet 2.
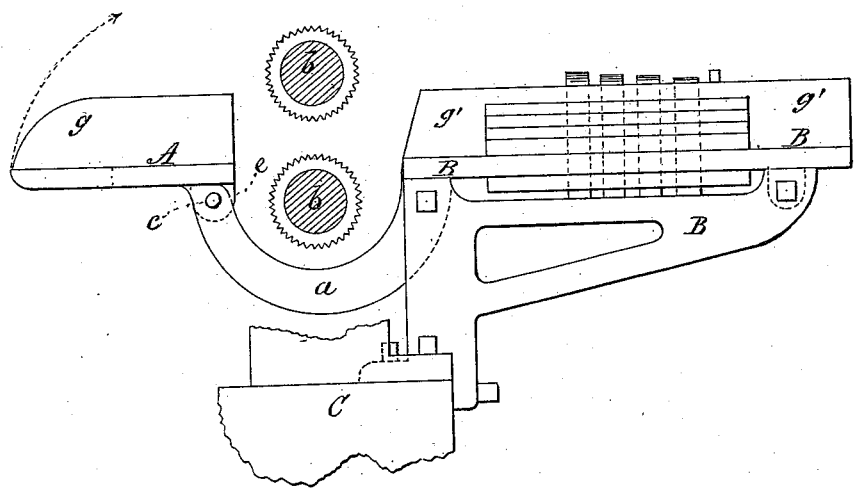
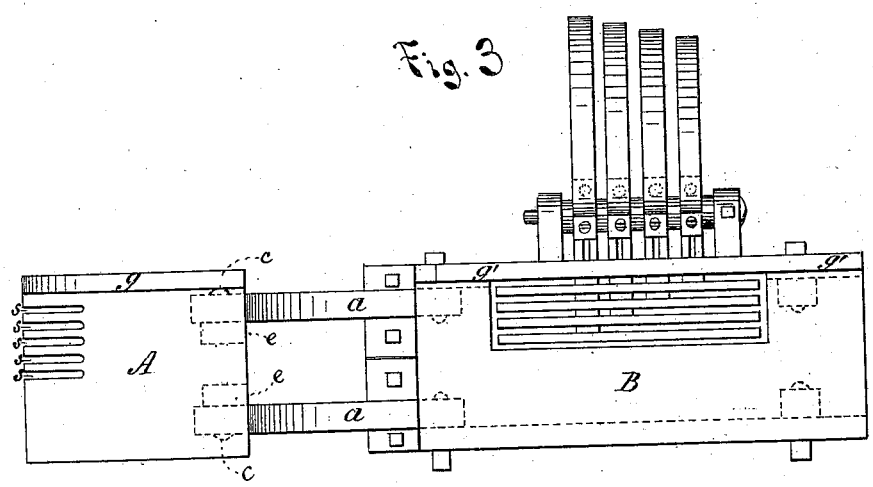
Witnesses.
K. F. Steele
C. M. Masi
Inventor.
Donald J. Murray.
R. H. Steele
Atty.

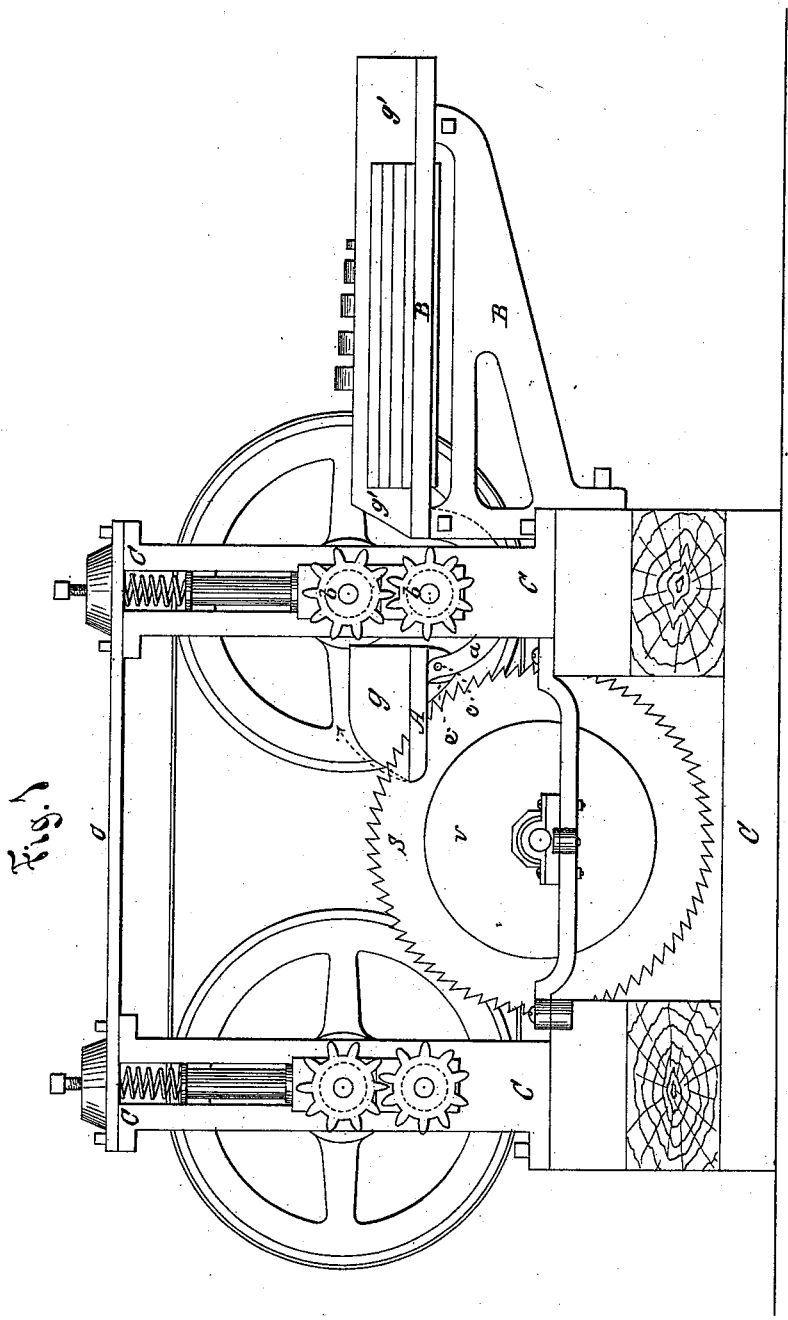

UNITED STATES PATENT OFFICE.

DONALD J. MURRAY, OF WAUSAU, WISCONSIN.

SAW-GUIDE.

SPECIFICATION forming part of Letters Patent No. 355,707, dated January 11, 1887.

Application filed March 9, 1886. Serial No. 194,639. (No model.)

*To all whom it may concern:*

Be it known that I, DONALD J. MURRAY, a citizen of the United States of America, residing at Wausau, in the county of Marathon and State of Wisconsin, have invented certain new and useful Improvements in Saw-Guides, of which the following is a specification, reference being had therein to the accompanying drawings.
My invention is an extension saw-guide for the feed-tables of lath-machines, being an adjustable attachment to feed-tables described in my Letters Patent No. 343,057, and dated June 1, 1886, said guide embracing, in brief, the following novel features: a preattaching table-plate of brass having comb-like slots cut into its free end sufficiently deep and wide to loosely and respectively include the descending rims of the revolving saws ranged in said machine-frames to which said feed-tables are attached, and also hinged by its rear end upon a pair of counter-arched arms projecting from the forward end of said feed-table and curving under the lower and adjacent feed-roller of said machine, all of which and their purposes are hereinafter more fully described, and illustrated by the accompanying drawings, in which like letters designate identical parts of said device in the different figures, respectively.
Figure 1 is the side elevation of one of the lath-machines to which one of said feed-tables is bracketed, showing said extension-guide hinged to the counter-curved arms of the rear table. Fig. 2 is a side view of said feed-table and its extension-guide, the former bracketed to a sectional portion of a lath-machine; and Fig. 3 is a plan view of said feed-table and its hinging extension.

The letter A represents said extension guide-plate, which consists of a table-plane of sufficient dimensions and suitable shape to allow the lath-bolts to be easily and evenly slid upon it through its intermedial feed-rollers from the plane of the feed-table behind, and thereby fed to the saws until said bolts have been completely cut into laths, and consequently after said cutting has been entirely finished, whereby the said bolts are prevented from being forced down by the revolving saws S upon their clamping shaft-collars *v*, and thus causing, should the timber be anywise brittle, the partially-cut laths to be broken and damaged.

Said extension-plate is made of brass, as the metal least likely to damage the teeth of the saws, should any of them accidentally strike the front edge of said plate, and is hinged by its rear end upon the pair of arms *a*, projecting from the forward end of said feed-table B by similarly counter-arching curves under the lower and adjacent feed-roller of said saw-frame C, as shown. The front ends of said arms are recurved so as to mutually point outward on an even plane, the one with the other, and support in a horizontal position the free end of the hinged plate, the pintle *c* of which has its bearing ends passed equally through suitable bolt-holes made directly through both said horizontal arm ends and the hinge-lugs *e*, the latter formed underneath the rear end of said hinged plate, so as to be hinge-bolted each on the inner face of the rear portion of its respective arm end, which mode of hinging serves to give the free end of said provect plate, which projects about half its length forward of said arm ends, an eccentric movement upward and backward, and thereby allow the same to clear the saws whenever they are to be adjusted or entirely removed from their arbor-shaft, while said hinge and arm ends together prevent the hinged plate from being depressed below a level with the rear feed-table by the force of the revolving saws upon the intermedially-sliding lath-bolt.

The free end of the extension-table A has the rectangular slots *s* cut into it, of suitable and equal depth, width, and distance apart to freely include within them, and between the longitudinal edges of the comb-like teeth thus made on each side of them, all and respectively the saws suitably ranged upon the saw-shaft in front of the slotted plate, whereby the front end of the lath-bolt is suitably cut into before said end passes the front edge of the guide-table, and the rear end of the same bolt is entirely cut through by the several saws before said lath-bolt passes from the front table, thereby cutting said slid lath-bolt into unbroken laths before it passes from said table and the saw-rims continuously descending through said including slots. A vertical side piece or rigid guide, *g*, is made upon the rear side edge of said hinged plate of similar height and thickness, and ranged directly in line with the rigid guide *g'* of the feed-table to the rear, in order that the lath-bolt placed upon said table can be fed evenly to the saws.

I am aware that it is not new to place a plate having slots that form fingers to project between the saws in front of the feed-rollers and forming an adjustable continuation of the feed-table; but my invention takes this old feature of saw feed-tables and forms with it elements for a new and useful combination as a practical improvement upon my aforesaid patented feed-table; therefore,

What I claim as new, and desire to secure by Letters Patent, is—

The preattachable brass table-plate having the evenly cut and ranging saw-slots in its front end, the ranging and rigid fore-guide upon its rear side edge, and the hinging-lugs underneath its rear end, in combination with a lath-machine rear-attached feed-table provided with the pair of intermedially counter-arched arms having evenly hinging and supporting front ends, all made to adjustively co-operate with the rangingly-arbored saws of the lath-machine to which said rear guide-table is attached, substantially as and for the purposes herein specified.

In testimony whereof I affix my signature in presence of two witnesses.

DONALD J. MURRAY.

Witnesses:
H. H. FOSTER,
W. D. MURRAY.